3,271,353
POLYESTERS AND PRESSURE-SENSITIVE
ADHESIVE COMPOSITIONS
Theodore H. Szawlowski, Wonder Lake, Ill., and Louis A. Joo, Johnson City, Tenn., assignors, by mesne assignments, to Union Oil Company of California, Los Angeles, Calif., a corporation of California
No Drawing. Filed Dec. 27, 1962, Ser. No. 247,515
9 Claims. (Cl. 260—40)

This invention relates to a novel class of polyesters and pressure-sensitive adhesive compositions containing modified, saturated and unsaturated polyester resins and more particularly to novel pressure-sensitive polymerized resins of the polyester type prepared from certain new acids derived from petroleum fractions, unsaturated or saturated dibasic acids or their anhydrides and glycols or polyols and containing an excess of acid equivalents. The novel adhesive polymerized resins of this invention are distinguished from the prior art resins in that they are derived from complex carboxylic acids prepared from sulfur-containing aromatic compounds of petroleum origin by metalation, carbonation and acidification. In the preparation of the polyester resins using the complex carboxylic acids derived from petroleum fractions as part of the acid reactant with a glycol or polyol, the reaction is conducted using an excess of acid equivalents over the total number of hydroxyl equivalents. This ratio is preferably within the range of 1.1/1 to 2.5/1.

Another feature of the invention is the discovery that the novel polymerized polyester resins prepared from (1) the complex carboxylic acids derived from sulfur-containing aromatic compounds of petroleum origin (extract polycarboxylic acids), (2) dibasic acids or their anhydrides and (3) glycols or polyols, and preferably wherein one or the other or both of the latter ingredients is or are unsaturated, have properties which make them highly suitable as pressure-sensitive adhesive compounds, in addition to the other uses herein disclosed.

This invention, accordingly, also relates to novel pressure-sensitive adhesive compositions which incorporate as part of the composition polyester resins prepared from acids, part of which comprises extract polycarboxylic acids derived from solvent extracts obtained in the solvent extraction of mineral lubricating oils. In one aspect of this invention, there is provided novel adhesive compositions containing the polyester resins so prepared which are storage stable, and are characterized by their resistance to viscosity or adhesiveness changes over long periods of time.

Accordingly, an object of this invention is to provide novel polymerized polyester pressure-sensitive adhesive resins and articles of manufacture incorporating a backing material coated with a film of said resins.

An object of this invention is to provide a method of preparing novel polymerized polyester pressure-sensitive adhesive resins.

Still another object of this invention is to provide improved sealing and adhesive compositions.

These and other objects will be described or become apparent as the specification proceeds.

Now, in accordance with this invention, we have discovered that the use of mixed complex carboxylic acids derived from such sources as solvent extracts, hydrogenated solvent extracts, FCC recycle stock and decant oil in the formation of polymerized or polymerizable polyester resins forms a product which has adhesive and sealing properties superior to the prior art sealants and pressure-sensitive adhesive compounds. The polymerized polyester resins used in accordance with this invention are prepared by any of the known methods for reacting acids and alcohols of the types disclosed herein for the purpose of preparing polyester resins of polymerized or cross-linked nature. Accordingly the techniques used herein for esterification need not be described in every detail except where the procedure departs from the prior art in order to control the properties of the end products or attain complete utilization of reactants. Accordingly the reactants will be first described, followed by the procedures and specific examples.

THE MODIFYING COMPLEX CARBOXYLIC ACID

The modifying complex carboxylic acids or acid mixtures used in accordance with this invention are prepared in accordance with the processes disclosed in copending applications, Serial No. 819,932, filed June 12, 1959, by T. W. Martinek (now abandoned and application Serial No. 220,344, filed August 1, 1962, as a continuation thereof) and Serial No. 79,661, filed December 30, 1960, by Messrs. W. E. Kramer, L. A. Joo and R. M. Haines (now U.S. Patent 3,153,087).

These acids are further described in related copending applications, Serial No. 79,541, filed December 30, 1960, by Messrs. W. E. Kramer and L. A. Joo (now U.S. Patent 3,154,507), and Serial No. 79,506, filed December 30, 1960, by T. W. Martinek (now U.S. Patent 3,116,257).

In accordance with said copending applications the complex, polynuclear, aromatic, and alkaromatic carboxylic acids used to prepare the novel compositions of this invention are derived by metalation, carbonation, and acidification of a source of complex, polynuclear, aromatic nuclei.

The resulting complex carboxylic acids, especially those prepared from solvent extracts, are mixtures of mono-, di-, and polycarboxylic acids. Through chemical analysis, characterization and study of the physical and chemical properties, by way of illustration only, the extract acids can be represented by the following formulae:

*Monobasic acids*

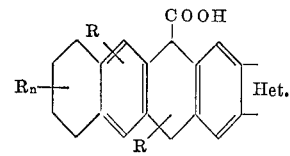

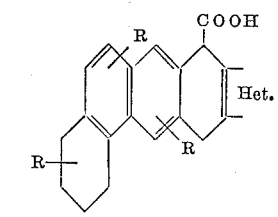

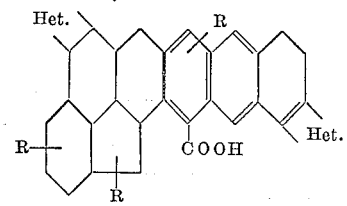

*Dibasic acids*

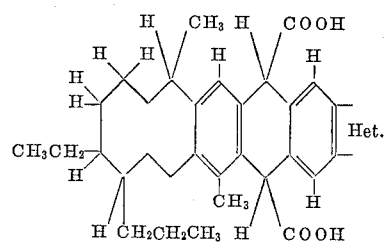

Dibasic acids—Continued

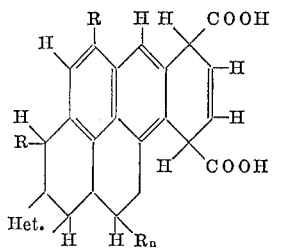

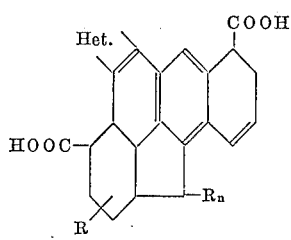

Tribasic acids

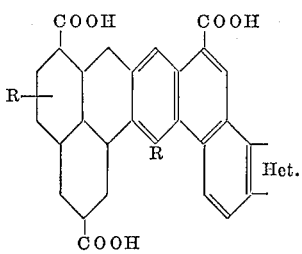

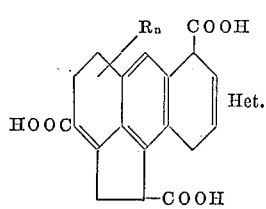

wherein "Het." illustrates one or more S—, N—, or O-containing heterocyclic ring substituents, R is an alkyl or cycloalkyl radical having a total of 5 to 22 carbon atoms for each nuclei, and $n$ has a value of 3 to 10. The molecular weight of the extract acids ranges from about 300 to 750, and the average molecular weight is about 350–475. Table I gives representative physical and chemical properties of the complex mono-, di- and polycarboxylic acids to be used in accordance with this invention.

TABLE I

| Property: | Value |
|---|---|
| Av. mol. wt. range | 350–475. |
| Melting point | 60–100° C. |
| Bromine No. | 4–24. |
| Percent sulfur | 1.0–4.5. |
| Color | Deep red–dark brown. |
| Percent Nitrogen | 0.01–0.04. |
| Ave. no. of arom. rings | 1.7–5.0. |

In the mixture of acids produced by metalation, carbonation, and acidification of solvent extracts, the mono-basic acid derivatives constitute from 5–95% by weight, the dibasic acids constitute from 5–95% by weight and the polybasic acids, that is those acids containing from 3 to as high as 7 carboxyl groups, make up from 0 to 20% by weight. In the preferred embodiment of the invention, the mixture of acids produced by metalation, carbonation, acidification of solvent extracts from the manufacture of refined mineral lubricating oils may be used although fractions of such acids, such as those prepared by the method of copending application, Serial No. 161,355, filed December 22, 1961, by I. A. Joo and W. E. Kramer, Serial No. 207,741, filed July 13, 1962, by L. A. Joo (now abandoned) and Serial No. 207,780, filed July 13, 1962, by L. A. Joo (now U.S. Patent 3,180,876) may also be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of an alkali metal, such as sodium, potassium, cessium, lithium, and rubidium, and their mixtures and amalgams, at a temperature of about 60° to 80° C. in the presence of a reaction solvent such as dimethyl glycol ether, dimethyl ether methylalkyl ethers, dialkyl glycol ethers, tetrahydrofuran, methylal, and trimethylamine. The formation of the adduct is promoted by shearing and agitation, providing an excess of alkali metal, using a pre-formed dispersion of the alkali metal in an inert solvent, or using a preformed dispersion of the alkali metal in a portion or all of the solvent extract. These techniques overcome the induction period of the reaction due to impurities, including sulfur compounds present therein, which tend to coat the alkali metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acids which, upon acidification with a mineral acid, yields the desired complex, polynuclear, carboxylic acids in good yields. To illustrate, the following non-limiting examples are given.

EXAMPLE I

One hundred gms. of extract oil No. 19 (Table III) from the preparation of 170 vis., 100 VI neutral oil, dissolved in 675 cc. of dry tetrahydrofuran, was reacted with agitation at 10° to 30° C. with 8.3 gms. of metallic sodium in the form of 5/16″ cubes. After 25 minutes, adduct-formation begin and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule (acid No. 1 of Table II).

EXAMPLE II

One hunddred gms. of extract oil No. 19 (Table I) and 675 ml. of dry tetrahydrofuran were charged to a 1 liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls, 5/16" in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

EXAMPLE III

The process of Example II was repeated producing complex acids having a saponification value of 323, an indicated equivalent weight of 173, an indicated average molecular weight (cryoscopic) of 600, and containing 3.0% sulfur. The ratio of molecular weight to equivalent weight was 3.5 indicating a mixture containing acids with more than two carboxyl groups per molecule on the average.

EXAMPLE IV

The various recovered acids of application Serial No. 819,932, now abandoned, illustrated in Table II therein, are further examples of mono-, di-, and polycarboxylic acids to be used to prepare the modified polyester resins to be used as adhesive agents in accordance with this invention.

EXAMPLE V

The various carboxylic acid products described in Runs 12 through 47 of application Serial No. 79,661, now U.S. Patent 3,153,087, are further examples of acids that may be used.

In order to further illustrate the complexity and types of modifying acids that can be used in accordance with this invention the following tabulation is given:

TABLE II.—TYPICAL PROPERTIES OF A NUMBER OF EXAMPLE COMPLEX ACIDS (EPA)

| No. | Sap. Value | Mol. Wt. | Percent S | Br. No. | Percent Unsap. | Eq. Wt. | Eqs/Mol. | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 [1] | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |
| 102 [2] | | 320 | | | | | | 240 |

[1] This EPA was used in the examples set forth herein.
[2] Prepared from decant oil (API 15.4°, RI 1.5425).

The starting material for the reaction to prepare the complex modifying acids may be any complex, polynuclear, and/or heterocyclic aromatic hydrocarbon from synthetic or natural sources. A preferred and unique source of aromatic starting material comprises petroleum fractions rich in more complex, polynuclear, aromatic hydrocarbons, not only because the mono-, di-, and polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the mono-, di-, and polybasic

TABLE III.—SOURCES AND PHYSICAL CHARACTERISTICS OF SOLVENT EXTRACTS

| Ext. No. | Crude Source | Solvent | API Grav. | Sp. Gr. at 10° F. | Vis./100° F. | Vis./130° F. | Vis./210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | East Tex | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of S5 Vis neutral, has an average molecular weight of 300 and contained 76.8% aromatics (by the silica gel procedure).

Extract No. 42 was obtained in the production of 150 Vis Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 84.1% aromatics, 15.9% saturates, analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

carboxylic acids, or their mixtures, of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined by treatment with said selective solvent having an affinity for the aromatic compounds. The solvent extracts illustrated herein are also examples of the oleaginous vehicle which can be all or part of the compositions of this invention.

The complex hydrocarbons removed by this refining treatment often contain appreciable amounts of combined sulfur, nitrogen, and oxygen. These complex hydrocarbons contain a predominance of polynuclear rings of aromatic structure, and of condensed configurations having hydrocarbon substituent groups attached thereto as side chains. These starting materials are of a generally viscous nature, have low viscosity indices, low resistance to oxidation, and are considered to be deleterious in lubricating oils. Heretofore, solvent extracts have been regarded as waste products, and because they are exceedingly complicated mixtures of complex compounds, including various sulfur-, oxygen-, and nitrogen-containing compounds, they have not been used successfully in preparing petrochemicals or as sources of hydrocarbon reactants or starting materials.

Since the general process of refining mineral lubricating oils in which solvent extracts are obtained is well known, and is related in detail in said copending applications, e.g., application Serial No. 162,279, it is only necessary for present purposes to give some examples by way of illustration. Above are the physical characteristics of typical extract products, from lubricating oil stocks derived from various crude oils and other source hydrocarbon materials, which may be used to prepare extract acids for modifying polyester resins to be used as adhesive adducts for the compositions of this invention.

The solvent extracts from lubricating oils used as starting materials for this invention have the following general properties and characteristics:

TABLE IV

| Characteristic: | Range of value |
| --- | --- |
| Gravity, ° API | 7.3–18.3 |
| Gravity, sp., 60/60° F. | 0.945–1.022 |
| Viscosity SUS @ 210° F. | 40–1500 |
| Viscosity index | −128–+39 |
| Pour point (max.) ° F. | +35–+100 |
| Molecular weight, average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds percent by vol. | 20–50 |
| Aromatic compounds | 25–90 |
| Neutral aromatic hydrocarbons | 40–51 |
| Av. no. of aromatic rings/mean arom. mol. | 1.7–5.0 |

For purposes of this invention the complex carboxylic acids are defined as being produced by metalation, carbonation and acidification of a source of complex high-molecular-weight polynuclear aromatic and heterocyclic compounds of petroleum origin containing sulfur, said acids having molecular weights of about 350, have at least one carboxyl group and preferably have 2 to 7 carboxyl groups or contain about 35% of dibasic acids, contain about 1.0 to 4.5% by wt. of sulfur and have nuclei which have about 1.7 to 5.0 aromatic rings per mean aromatic molecule.

The complexity of the types of compounds present, as based on these analyses, is illustrated by the following table:

TABLE V.—ESTIMATED CHEMICAL COMPOSITION OF SOLVENT EXTRACTS NOS. 19, 21, 43 AND 44 OF TABLE III

| Type of compound: | Approx. percent in the extract |
| --- | --- |
| Saturated hydrocarbons | 12.5 |
| Mononuclear aromatics—Substituted benzenes | 25.0 |
| Dinuclear aromatics—Substituted naphthalenes | 30.0 |
| Trinuclear aromatics— | |
| Substituted phenanthrenes | 10.0 |
| Substituted anthracenes | 5.0 |
| Tetranuclear aromatics— | |
| Substituted chrysenes | 00.5 |
| Substituted benzphenanthrenes | 0.2 |
| Substituted pyrenes | 0.2 |
| Pentanuclear aromatics—Perylene | 0.01 |
| Sulfur compounds,[1] oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated, prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of about +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–50 p.s.i.g. using temperatures of 530–600° F. in the presence of a molybdena-silica-alumina catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour points, −5° F.; vis. @ 100° F., 1075 SUS: vis. @ 210° F., 58.5 SUS; VI, −96; neut. No. (1948), 0.05; sulfur, 2.60 wt. percent and C.R. percent, 0.01.

The catalyic cracking of those fractions of crude petroleum oils between diesel burning oil and vacuum residuals furnishes sources of complex, high-molecular weight polynuclear aromatic and heterocyclic compounds utilizable as alternate feed materials for the preparation of the complex carboxylic acids and the novel activator products of this invention. The Orthoflow Fluid Catalytic Cracking process of the M. W. Kellogg Co. is illustrative wherein any of the heaviest virgin gas oils that do not contain excessive heavy metal contents (which cause catalyst poisoning) are treated to fluid catalytic cracking to produce gasoline, heating oils, heavy fuel oils, and fuel gas. During the process at least two by-product streams are produced which are sources of complex polynuclear aromatic sulfur-containing compounds that can be utilized in accordance with this invention, namely, the heavy FCC cycle stock (or so-called heavy gas oil) and the decant oil. The preparation of these by-product streams is illustrated as follows, said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates i.e., heavy gas oils from the distillation of crude oils, in an amount of about 23,750 b.p.s.d., is preheated by exchange and sent to the Orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to desuperheat the entering material and to condense the slurry recycle and decanted oil. Heat recovered from the tower by the slurry reflux is used for reboiling in the recovery and catalytic polymerization sections, for preheating fresh feed and for the generation of steam in a waste heat boiler.

The slurry settler in the base of the fractionator, separated therefrom by a solid internal head, is fed by the slurry reflex pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn at appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor as reflux to the tower. A portion of this stream after cooling, is sent to storage. Light gas oil product, lean oil, gland oil, overhead vapors and gas streams are recovered in the upper sections of the tower, and separately processed, i.e., the gas from the process is compressed subjected to catalytic polymerization. The 23,750 b.p.s.d. of feed produces about 11,506 b.p.s.d. of gasoline, 2,381 b.p.s.d. of heating oil, 8,944 b.p.s.d. of heavy fuel oil and 1,263 b.p.s.d. of fuel gas.

In the treatment of 17,750 b.p.s.d. of fresh feed comprising distillates using a synthetic cracking catalyst at 900° F., 70% conversion at 1.5 through-put ratio (total charge divided by fresh feed) about 2,840 b.p.s.d. of $C_4$ hydrocarbons, 8,700 b.p.s.d. of $C_5$—400° gasoline, 4,438 b.p.s.d. of 400–600 light FCC cycle stock and 887 b.p.s.d. of decant oil is produced.

To illustrate, 17,004 b.p.s.d. of fresh feed and 4,253 b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, space velocity of about 2.4 to produce 4,152 b.p.s.d. of light catalytic distillate, 7,516 b.p.s.d. of heavy gas oil recycle, 1,920 b.p.s.d. of decanted oil and 497 b.p.s.d. of net slurry recycle. The characteristics of the heavy cracked gas oil and decanted oil are shown in the following table.

TABLE VI.—PRODUCT CHARACTERISTICS

|  | Heavy FCC Recycle Stock | | Decanted Oil | |
| --- | --- | --- | --- | --- |
|  | No. 1 | No. 2 | No. 1 | No. 2 |
| Distillation: | | | | |
| ASTM D-1160 at 10 MM.: | | | | |
| IBP, ° F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 MM.: | | | | |
| IBP, ° F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158: | | | | |
| IBP, ° F | 479 | 462 |  |  |
| 50% | 616 | 618 |  |  |
| EP | 712 | 712 |  |  |
| Viscosity, $C_s$ at— | | | | |
| 100° F | 6.16 | 6.16 | ¹ 22.0 | ¹ 22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour Point, ° F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline Point, ° F | 155.0 | 154.0 | 154.0 | 153.0 |
| °API | 26.2 | 25.7 | 14.8 | 14.6 |

¹ Extrapolated values.

The catalyst used in these experiments was a silica-alumina fluid cracking catalyst.

The heavy cracked gas oil or heavy FCC cycle stock and decanted oil products above are illustrative of sources of complex high-molecular-weight polynuclear aromatic compounds to be used to prepare complex carboxylic acids from which the polyester resins of this invention are derived. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: °API, 1.8; sulfur, 1.9 wt. %; Br. No. 17; RI (20° C.) 1.6372 and Engler distillation, IBP=589° F.; 90%—745° F. The use of these latter starting materials is described in copending application Ser. No. 79,661, now U.S. Patent 3,153,087.

The results of hydrogenation of several of the solvent extracts shown in Table III to produce hydrogenated or dewaxed and hydrogenated solvent extracts as starting materials for the preparation of the complex acid mixture and subsequent ester preparation are shown in Table VI.

TABLE VII.—HYDROGENATION OF SOLVENT EXTRACTS AND PRODUCTS

| Run No | 1 | 2 | 3 | 4 | 5 | 6 | 7 | 8 | 9 | Range of Conditions and Product Properties |
|---|---|---|---|---|---|---|---|---|---|---|
| Reaction Conditions: | | | | | | | | | | |
| Extract No | 43 | 44 | 44 | 44 | 41 | 43 | [1]43 | 44 | [1]44 | |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., °F | 700 | 700 | 650 | 650 | 650 | 675 | 700 | 700 | 720 | 650–720 |
| Pressure, p.s.i. | 500 | 500 | 400 | 300 | 400 | 400 | 500 | 500 | 500 | 300–500 |
| Catalyst | ([2]) | ([2]) | ([2]) | ([2]) | ([2]) | ([2]) | ([2]) | ([2]) | ([2]) | ([2]) |
| Products: | | | | | | | | | | |
| Neut. No | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., °API | 12.8 | 9.4 | 8.5 | 8.8 | 18.5 | 11.8 | 12.9 | 10.1 | 9.7 | 8.0–15.0 |
| Vis at 100° F | 663.7 | 1,133 | 1,457 | 1,452 | 132.5 | 808.7 | 851.1 | 464 | 1,058 | 450–1,500 |
| VI | −33 | −96 | −115 | −114 | −9 | −49 | −52 | −83 | −96 | −120 – −9 |

[1] Dewaxed.
[2] Filtrol.

Table VI also sets forth the range of conditions and products properties that are generally applicable in the preparation of hydrogenated solvent extracts as starting materials in the preparation of the complex acids to be used in this invention.

Another typical example of an FCC decant oil is one having an API gravity of 15.4°, IBP 375° F. and EP 995° F. at atmospheric pressure, cs. vis. @ 100° F. 21.00, cs. vis. @ 210° F. 3.66 percent S 0.870, Ramsbottom C 1.70, mol. wt. 320, vis.gr.con. .945, Br, No. 8.0. The 47 vol. percent extract from this decant oil has a specific gravity of 1.095, exhibits the same initial boiling point and end boiling point and has the following characteristics: cs. vis. @ 100° F. 223.5 cs. vis @ 210° F. 7.80, percent S 1.44, Ramsbottom C 5.7, vis.gr.con. 1.103, Br. No. 14.0, which is another species of the starting material.

Without limiting the invention, the characteristics of the adhesive-cohesive products of this invention as influenced by the complex acids are further disclosed as thus far evaluated. The mono-, di-, and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl substituents varies between 5 to 22. Despite the size of the acid molecules the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of brought stocks probably contain more highly condensed aromatic structures. Most of the sulfur is in the form of heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikian and Skrabek (Anal. Chem., 28, 1928 (1956)). They are soluble in ethyl ether, acetone, methyl ethyl ketone, tetrahydrofuran, benzene, toluene, and xylene.

THE RESINS AND THEIR PREPARATION

The resins used in the adhesive compositions of this invention are pressure-sensitive resins, prepared from the afore-described polycarboxylic acids derived from said sources of complex polycyclic nuclei of heterocyclic nature by reaction of the complex acids with glycols or polyols and dibasic acids or their anhydrides (preferably one or both of the glycol or dibasic acids being unsaturated) under esterification conditions.

The resins used in the compositions of this invention are prepared using the known prior art methods or the methods disclosed in depending applications bearing Serial Numbers 55,123 (now U.S. Patent 3,129,192), 79,541 (now U.S. Patent 3,154,507); 79,506 and 79,498, now U.S. Patent 3,222,307, using the following outline:

(1) Complex carboxylic acids+an unsaturated dibasic acid + a saturated alcohol, glycol or saturated polyol or mixture of said alcohols, glycols and polyols.

(2) Complex carboxylic acids+saturated dibasic acid +an unsaturated alcohol or glycol or an unsaturated polyol or mixture of said alcohols, glycols and polyols.

(3) Complex carboxylic acids + an unsaturated dibasic acid+an unsaturated alcohol or glycol or an unsaturated polyol or mixture of said alcohols, glycols and polyols.

Said reactions are conducted under esterification conditions using an excess of acid equivalents to form monomeric liquid esters or partially polymerized liquid esters which are not completely cured and not thermosetting. The ester resins are flexible i.e., capable of indefinite, inelastic deformation at elevated temperatures, and generally liquid and capable of forming thermosetting resins upon reaction with a cross-linkage monomer, such as styrene to form a thermosetting resin of little flexibility and once cured in this manner cannot be softened by heating and reformed. The cured styrenated resins and their preparation are described in copending application Serial Number 242,076, filed December 4, 1962. All of the reactants used to prepare the resins of this invention are either difunctional or polyfunctional and of saturated or unsaturated character, preferably the latter, wherein the degree of unsaturation is not less than 20 mol percent based on the total of said reactants exclusive of the extract polybasic acids, and preferably about 25 to 80 mol percent either in the dibasic or glycol portion of the reactants or based on both of said portions of reactants.

In the foregoing outline the complex polycarboxylic acids can be a mixture of mono-, di-, and polycarboxylic acids as produced through metalation, carbonation and acidification of said starting materials or any fraction thereof which predominates in complex di-, or polycarboxylic acids, i.e., has about 10% by weight or less of monocarboxylic acids. The saturated or unsaturated dibasic acids used as a separate ingredient in addition to said complex acids, also includes their anhydrides and various mixtures thereof. Similarly the saturated or unsaturated glycols or polyols may be in the form of mixtures or relatively pure compounds.

In reacting a complex polyfunctional mixture of reactants as contemplated by this invention under the foregoing outline, several competitive reactions take place simultaneously. The following formulae are accordingly representative of the final product where an excess of acid equivalents is used:

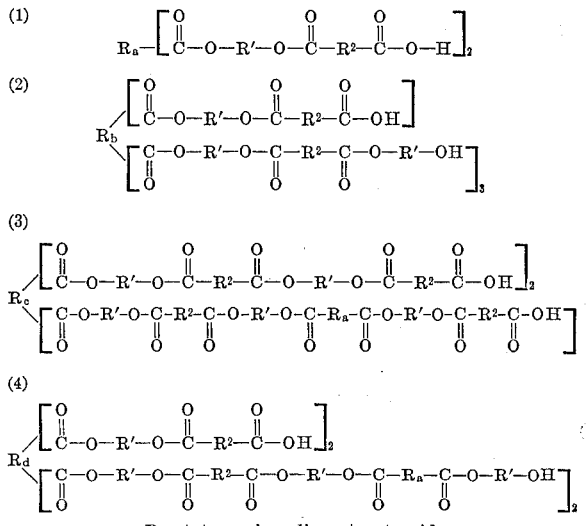

$R_a$=tetracarboxylic extract acid
$R_a$=dicarboxylic extract acid

In each of the formulae R is the complex, condensed ring, high molecular weight radical of a complex polycarboxylic acid, here represented as having 2–5 carboxylic groups, R' is the organic radical of a saturated or unsaturated polyol (dihydric in this instance) and $R^2$ is the organic radical of a saturated or unsaturated dibasic acid i.e. maleic acid.

The position of the double bond in the glycol or dibasic acid molecule is immaterial and monomeric diesters and polymerized forms thereof based on any position of the double bond are contemplated.

In the formula R is the nucleus of the complex carboxylic acid, $R^1$ is a hydrocarbon radical of the glycol containing 2 to 20 carbon atoms and may be alkyl, aryl, alkaryl, aralkyl, and cycloalkyl in configuration, and $R^2$ is a hydrocarbon radical of the dibasic acid containing 2 to 20 carbon atoms and may be alkyl, aryl, alkaryl, aralkyl, polyaryl (naphthyl) and cycloalkyl in configuration.

The compositions of this invention, in one aspect thereof, contain polymerized polyester resins predominating in two or more combined or polymerized esters of the foregoing formulae.

The polyester adhesives of this invention are prepared with facility by known esterification methods and conditions. It is only necessary to place the complex acids and the selected unsaturated or saturated dibasic acid and unsaturated or saturated glycol in a reaction vessel in such proportions that the total acid equivalents of the combined acids is greater than the total hydroxyl equivalents of the combined glycols and heat same at least to the melting point of the reactants, and/or to a temperature sufficient to drive off the water of esterification from the reaction mass. Any solvent which is inert with either reactants or the products may be used as the azeotroping agent to remove water as the reaction proceeds. The use of a catalyst is optional.

The total acid equivalents must be greater than the total hydroxyl equivalents in order to obtain adhesive properties. The ratio of total acid equivalents to total hydroxyl equivalents is preferably 1.1/1 to 2.5/1. The dibasic acid used must be compatible with the complex carboxylic acids and one which does not form solid polyesters. The ratios of the components used to prepare the adhesives can be varied over a wide range to achieve different degrees of adhesiveness. In a preferred embodiment the combination of about 1.0 acid equivalent of complex polycarboxylic acid, 1.5 acid equivalents of a low-molecular-weight dibasic acid or anhydride, such as maleic anhydride, and about 2.0 hydroxyl equivalents of combination of glycols, as for example about 1.5 hydroxyl equivalents of triethylene glycol and 0.5 hydroxyl equivalents of diethylene glycol, are used.

The molecular weight and adhesive properties of the polyesters is also influenced somewhat by the temperature of the reaction which can be from about 70° F. to 500° F. Other ways of controlling the molecular weight and properties of the adhesive resins of this invention are choice and concentration of the polymerization catalyst and the use of "chain-breakers," or a polymerization inhibitor such as hydroquinone.

Any of the known esterification catalysts may be used to speed up the reaction, such as sulfuric acid, other mineral acids, boron trifluoride or other Lewis acids. The preferred method of ester synthesis involves refluxing about 1.0 acid equivalent of the complex polycarboxylic acids with about 1.5 acid equivalents of a dibasic acid and a total of no more than about 2.4 hydroxyl equivalents of the glycol. An inert diluent, such as xylene, may be used when convenient for lowering the reflux temperature and removing water as an azeotropic mixture.

Any and all unsaturated dibasic acids can be used and are intended to be used in preparing the adhesive compositions of this invention. Unsaturated dibasic acids which are most suitable for use in preparing the unsaturated polyester resins used in our sealants include, but are not limited to, maleic acid or anhydride, chloromaleic acid, bromomaleic acid, fumaric acid, mesaconic acid, itaconic acid, citraconic acid or anhydride, etc., that is containing 4 to 20 carbon atoms and preferably 4 to 10 carbon atoms and being primarily aliphatic in nature. Also any and all saturated dibasic acids and their anhydrides can be used and are intended within the scope of this invention. These are illustrated by the aliphatic dicarboxylic acids of 2 to 20 carbon atoms and the alicyclic dicarboxylic acids of 5 to 20 carbon atoms and the aromatic dicarboxylic acids of 8 to 20 carbon atoms such as oxalic, malonic, succinic, glutaric, methylsuccinic, dimethyl malonic, adipic, β-methyl glutaric, ethyl succinic, isopropylmalonic, pimelic, submeric, azelaic, n-hexyl succinic and 1,14-tetradecane dicarboxylic acid; and 1,1-cyclopropylmalonic acid, cyclohexyl malonic acid, terephthalic, phenylmalonic, homophthalic, phenylsuccinic and α, β-diphenylsuccinic acid.

The saturated or aromatic dibasic acids and anhydrides to be used in accordance with a preferred embodiment of this invention include but are not limited to phthalic acid, phthalic anhydride, isophthalic acid, tetrahydrophthalic acid, hexahydrophthalic anhydride, endomethylene tetrahydrophthalic acid and its anhydride, tetrachlorophthalic acid and its anhydride, hexachloroendomethylene tetrahydrophthalic acid and its anhydride.

Any and all alcohols, diols, glycols and polyols can be used and are intended within the scope of this invention. Preferred glycols include diethylene, triethylene, dipropylene, and tripropylene glycols, hydrogenated bisphenol-A, 1,6-hexamethylene glycol, etc. Less preferably, lower-molecular-weight glycols, such as ethylene glycol and propylene glycol, may be used in combination with higher molecular weight glycols.

Examples of unsaturated alcohols include the following non-limiting species:

allyl alcohol,
crotyl alcohol,
isocrotyl alcohol,
methyl vinyl carbinol,
2-pentene-1-ol,
3-pentene-1-ol,
4-pentene-1-ol,
3-pentene-2-ol,
4-pentene-2-ol,
2-methyl-2-butene-1-ol,
2-methyl-3-butene-1-ol,
2-hexene-1-ol, 2-heptene-1-ol,
2-octene-1-ol,
3-octene-1-ol,
4-octene-1-ol,
2-nonene-1-ol,
3-nonene-1-ol,
4-nonene-1-ol,
5-decene-1-ol,
6-decene-1-ol,
7-decene-1-ol,
8-undecene-1-ol,
9-tetradecene-1-ol,
10-heptadecene-1-ol,
9-octadecene-1-ol,
9-octadecene-2-ol,
2-eicosene-1-ol,
3-eicosene-1-ol,
3-dicosene-2-ol,
propargyl alcohol,
2-butyne-1-ol,
3-butyne-1-ol,
3-butyne-2-ol,
2-pentyne-1-ol,
3-pentyne-1-ol,
4-pentyne-1-ol,
3-pentyne-2-ol,
4-pentyne-2-ol,
2-butene-1,4-diol,
2-butyne-1,4-diol,
2-pentyne-1-ol,
1-pentyne-3-ol,
1-pentyne-4-ol,
dimethylethyenylcarbinol,
2-hexyne-1-ol,
3-hexyne-1-ol,
n-propylethynyl carbinol,
2-methyl-4-pentyne-2-ol,
methylethylethynylcarbinol,
4-methyl-2-pentyne-1,4-diol,
2-heptyne-1-ol,
3-heptyne-1-ol,
5-methyl-e-hexyne-2-ol,
methyl-n-propylethynylcarbinol,
4,4-dimethyl-2-pentyn-1-ol,
diethylethynylcarbinol,
methylethylpropynylcarbinol,
2,5-heptadiynl-4-ol,
2-octyne-1-ol,
3-octyne-1-ol,
3-octyne-2-ol,
3,5-octadiene-2,7-diol,
methyl-t-butylethynylcarbinol,
2,5-eimethyl-3-hexyn-2,5-diol,
3-nonyne-2-ol,
methyl-n-amyl ethynylcarbinol, and diisopropylethynylcarbinol to include the series

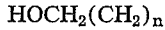

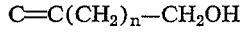

and

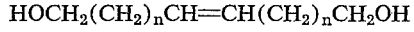

where in each instance $n=0, 1, 2, 3$, etc. up to 10 or more and $n'=0, 1, 2, 3$, etc. up to 10 or more.

Other aliphatic olefinic alcohols include divinylcarbinol,
2,4-hexadiene-1-ol,
1,5-hexadiene-3-ol,
1,3-hexadiene-5-ol,
1,5-hexadiene-3,4-diol,
2-methyl-3-pentene-2-ol,
4-methyl-3-pentene-2-ol,
2-methyl-4-pentene-2-ol,
4-methyl-4-pentene-2-ol,
isopropinylvinylcarbinol,
2,2-dimethyl-3-butene-1-ol,
4-heptene-1,
6-heptene-1-ol,
3-heptene-2-ol,
4-heptene-3-ol,
2-heptene-4-ol,
1,5-heptadiene-4-ol,
2-methyl-4-hexene-3-ol,
3-methyl-5-hexene-3-ol,
5-methyl-1-hexene-5-ol,
vinylisobutenylcarbinol,
2,4-dimethyl-3-pentene-2-ol,
2-isopropyl-3-hydroxy-1-butene,
us-2-octene-1-ol,
trans-2-octene-1-ol,
1-octene-4-ol,
2,4,6-octariene-1-ol,
2-methyl-6-heptene-2-ol,
6-methyl-2-heptene-6-ol,
6-methyl-3-heptene-6-ol,
us-2,5-dimethyl-3-hexene-2,5-diol,
8-nonene-1-ol,
4,6-dimethyl-1-heptene-4-ol,
citronellol (from rose oil),
thodinol,
phytol,
dipropenyl glycol,
4,6-dimethyl-1,5-heptadiene-4-ol,
w-undecylenyl alcohol,
oleyl alcohol, and
linoleyl alcohol.

The alicyclic olefinic alcohols such as 2-cyclopentenol,
2-cyclohexenol,
1-methyl-2-cyclohexenol,
2-(1-cyclopentenyl) ethanol,
1-vinyl-1-cyclopentenol,
1-methyl-2-cyclopentenyl-1-carbinol,
methyl-1-cyclopentenylcarbinol,
B-(1-cyclohexenyl)-ethanol,
1-allycyclopentanol,
ethyl-1-cyclopentenylcarbinol,
4-n-propyl-2-cyclohexenol (cryptol),
4-(2'-cyclopentenyl)-1-butanol,
1-methallycyclopentanol, and
trans-2-cyclohexenylcyclohexanol can be used.

The aromatic olefinic alcohols and phenols such as o-vinylphenol, cinnamyl alcohol, phenylvinyl carbinol, o-allylphenol o-propenylphenol, phenylpropenyl carbinol, methyl-styrylcarbinol, methyl- B-styrylcarbinol, phenylisobutylenecarbinol, 1-($\alpha$-naphthyl)-3-butene-1-ol, o-cinnamylphenol, 2-hydroxymethyl stilbene can be used.

The alicyclic and aromatic acetylenic alcohols such as 1-ethynylcyclopentanol, 1-ethynylcyclohexanol, 1-ethynylcycloheptanol, 4-cyclopentyl-2-butyne-1-ol, phenylethynylcarbinol, 1-phenyl-1-butyne - 3 - ol, 1-phenyl-1-butyne-4-ol, and diphenylethynylcarbinol can also be used.

As seen from the foregoing examples, $R^1$ in Formulae 1, 2, 3 and 4 may be an alkyl, aryl, alkaryl, aralkyl, cycloparaffinic radical or a hydroxyalkyl, hydroxyaryl, hydroxyalkaryl, hydroxyaralkyl or hydroxycycloparaffinic radical, containing up to 20 or more carbon atoms and —CH=CH— may be —C≡C— (acetylenic). Examples of alkyl groups include methyl, ethyl, propyl, isopropyl, butyl, isobutyl, t-butyl, amyl, isoamyl, hexyl, isohexyl, heptyl, octyl, nonyl, decyl, undecyl, dodecyl tridecyl, tetradecyl, pentadecyl, hexadecyl, heptadecyl, octadecyl, nonadecyl and eicosyl groups. The cycloparaffinic groups may be cyclopropyl, cyclobutyl, cyclopentyl, cyclohexyl, methyl cyclopentyl, and the like. Aryl and alkaryl groups include phenyl, naphthyl, anthryl, tolyl, sylyl and the like groups. Any of the foregoing may contain hydroxy groups to form the hydroxyl-containing series.

representative of this invention, had the following formulation:

TABLE VI

| Component | Equivalent Weight | Equivalent Ratio | Weight (gms.) | Acid and Hydroxyl Equivalents |
|---|---|---|---|---|
| Complex Acids | 262.2 | 1.00 | 262.2 | |
| Maleic Anhydride | 49.2 | 1.45 | 71.1 | 2.45 |
| Triethylene Glycol | 75.1 | 1.40 | 105.1 | |
| Diethylene Glycol | 53.0 | 0.40 | 21.2 | 1.80 |
| Quinone | | | 0.185 | |
| Xylene | | | (1) | (2) |

[1] 60 ml.
[2] Excess acid 0.65 equiv.

As seen from this description two types of esters, namely, those prepared from monohydric olefinic alcohols and those prepared from dihydric olefinic alcohols, are preferably used to prepare the polymerized resin products of this invention. However the invention is to be understood to apply to the use of any alcohol such as $C_1$ to $C_{20}$ aliphatic alcohols $C_6$ to $C_{37}$ aromatic alcohols and phenols, heterocyclic alcohols, $C_2$–$C_{20}$ aliphatic diols, $C_5$ to $C_{12}$ alicyclic diols, $C_6$ to $C_{26}$ aromatic dihydroxy compounds, $C_3$ to $C_{20}$ aliphatic olefinic alcohols, $C_5$ to $C_{12}$ alicyclic olefinic alcohols, $C_8$ to $C_{14}$ aromatic olefinic alcohols and phenols and $C_3$–$C_9$ aliphatic acetylenic alcohols.

The inert particulate filler can be any such material which acts to add body, bulk and/or strength to the adhesive composition. The filler can be, for example, silica flour zinc oxide, iron oxide, barium sulfate, glass wool, fiber glass, powdered clay, etc. In general, the inorganic filler may comprise 10–80% w. of the total formulation.

In order to demonstrate the invention the following examples are given.

EXAMPLE VI

A 249 g. portion (1 acid equivalent) of "extract dibasic acid" (225 acid number), 147 g. (3 acid equivalents) of maleic anhydride, 231 g. (2.2 g-moles) of diethylene glycol, and 330 g. (2.2 g. moles) of triethylene glycol are charged to resin kettle with 50 ml. of toluene (to form an azeotrope with water). The mixture is esterified at 400° to 450° F. under a nitrogen blanket (to prevent polymerization of the maleic anhydride) until the amount of water recovered is about equal to the calculated water of esterification. Then the toluene is distilled from the mixture and the product is cooled. The product of this formulation had very poor adhesive properties because of the presence of excess hydroxyl equivalents, and corresponds to the two unsaturated polyesters listed in the second and third columns of Table VI.

Three unsaturated polyesters were prepared from complex acids prepared from solvent extracts (designated "complex acids" in the table), maleic anhydride, diethylene glycol and triethylene glycol in various ratios using a conventional resin kettle and conventional esterification techniques, with xylene as the azeotroping agent. The polyester, having high adhesive properties and being The results obtained in comparing the adhesiveness of the above complex ester (No. 4) with commercial cellophane tape and two other esters (Nos. 2 and 3), prepared using an excess of hydroxyl equivalents, were as follows:

TABLE VII

| No. | Adhesive | Tape Size, inch | Force to Peel Adhesive from Bonderized Steel Plate (gms.) | Composition (Equivalents) EPA:MA-TEG:DEG | Comments |
|---|---|---|---|---|---|
| 1 | Cellophane | 1 | 550–695 | | Commer. tape. |
| 2 | Unsat. Polyester | 1 | 40–70 | 1:2–1.65:1.65 | Hydroxyl equiv. in excess. |
| 3 | do | 1 | 35–40 | 1:3–3.3:1.1 | Do. |
| 4 | do | 1 | 720–910 | 1:01.45–1.4:0.4 | Acid equiv. in excess. |

EXAMPLE VII

Following the procedure of Example VI a polyester is prepared by reacting under esterification conditions 1.5 acid equivalent of Acid No. 53 of Table II with 3 acid equivalents of fumaric acid, and 2.0 equivalents of DEG and 2.2 equivalents of TEG with 50 ml. of toluene at about 420° F. The product is an excellent adhesive.

EXAMPLE VIII

Following the procedure of Example VI a polyester is prepared by reacting an excess of total acid equivalents of complex acid No. 101 of Table II and itaconic acid with 1,6-hexamethylene glycol and dipropylene glycol to produce an adhesive product.

EXAMPLE IX

Following the procedure of Example VI the following proportions (shown in parenthesis) of the indicated reactants are subjected to esterification:

| No. | Complex Acid | Dibasic Acid | Glycol(s) |
|---|---|---|---|
| 1 | No. 102 of Table II (1.0) | Citraconic (1.5) | TEG(1.0). DEG(1.0). |
| 2 | No. 63 of Table II (2.0) | Maleic acid (1.0) | TEG(1.5). DEG(1.0). |
| 3 | No. 1 of Table II (2.5) | Maleic anhydride (2.0). | TEG(2.0). DEG(2.1). |
| 4 | Example III (2.6) | Maleic anhydride | TEG(2.0). DEG(2.0). | to produce the polyester products of this invention. The compositions of this invention can be used on any of the known applications for pressure-sensitive adhesives and to prepare products wherein a backing material such as paper, cloth, felt, canvas, rubber, plastics and the like is coated therewith.

The embodiments of this invention in which an exclusive property or privilege is claimed are defined as follows:

1. A composition consisting essentially of the reaction product (1) complex carboxylic acids obtained by metalation, carbonation and acidification of solvent extracts obtained in the solvent extraction of mineral lubricating oils using a solvent selective for aromatic compounds, said acids being characterized by containing 0.5 to 4.5 wt. percent of sulfur, 2 to 7 carboxyl groups per molecule and having an average of about 1.7 to 5.0 aromatic rings per mean aromatic molecule, (2) a dibasic acid and (3) a polyol under esterification conditions wherein an excess of total acid equivalents over the total number of hydroxyl equivalents is used.

2. A composition in accordance with claim 1 in which said complex acids are characterized by having an average molecular weight of about 350 to 475, contain about 0.5 to 4.5 wt. percent of combined sulfur and have an average of about 1.7 to 5.0 aromatic rings per mean aromatic molecule.

3. An adhesive composition in accordance with claim 1 in which said dibasic acid is unsaturated, the ratio of total acid equivalent to total hydroxyl equivalents is about 1.1/1 to 2.5/1 and the degree of unsaturation is not less than 20 mol percent based on the total of said reactants.

4. An adhesive composition in accordance with claim 1 in which both said dibasic acid and said polyol are unsaturated, the ratio of total acid equivalent to total hydroxyl equivalents is about 1.1/1 to 2.5/1 and the degree of unsaturation is not less than 20 mol percent based on the total of said reactants.

5. A composition in accordance with claim 1 in which about 1.0 acid equivalent of said complex acid is reacted with about 1.45 acid equivalents of maleic anhydride, 1.4 hydroxyl equivalents of triethylene glycol and 0.4 hydroxyl equivalents of diethylene glycol.

6. A composition in accordance with claim 1 in which said dibasic acid is a member of the group consisting of maleic acid, maleic anhydride, fumaric acid, itaconic acid, citraconic acid, and their anhydrides, phthalic acid, phthalic anhydride, isophthalic acid, tetrahydrophthalic acid, hexahydrophthalic acid, hexahydrophthalic anhydride, endomethylene tetrahydrophthalic acid, endomethylene tetrahydrophthalic anhydride, chlorophthalic acid, tetrachlorophthalic anhydride, hexachloroendomethylene tetrahydrophthalic acid, hexachloroendomethylene tetrahydrophthalic acid, hexachloroendomethylene tetrahydrophthalic anhydride and said polyol is a member of the group consisting of diethylene glycol, triethylene glycol, dipropylene glycol, tripropylene glycol, hydrogenated bisphenol A,1,6-hexamethylene glycol and mixtures thereof.

7. A pressure-sensitive adhesive composition formed by the esterification of complex carboxylic acids derived from solvent extracts obtained in the solvent extraction of mineral lubricating oils using a solvent selective for aromatic compounds by metalation, carbonation and acidification of said solvent extracts, maleic anhydride, triethylene glycol and diethylene glycol using an excess of total acid equivalents over the total hydroxyl equivalents.

8. A pressure-sensitive adhesive composition in accordance with claim 7 in which the ratio of total acid equivalents to total hydroxyl equivalents is about 1.1/1 to 2.5/1 and said esterification is conducted at a temperature of about 400° to 450° F.

9. An adhesive composition in accordance with claim 8 containing an inert filler of the group consisting of silica flour, zinc oxide, iron oxide, barium sulfate, glass wool, fiber glass, and powdered clay.

References Cited by the Examiner

UNITED STATES PATENTS

| | | | |
|---|---|---|---|
| 2,224,035 | 12/1940 | Long | 260—75 |
| 2,230,005 | 1/1941 | Moser | 260—75 |
| 2,952,646 | 9/1960 | Carmody | 260—75 |
| 2,970,164 | 1/1961 | Jezl | 260—451 |
| 3,129,192 | 4/1964 | Kramer et al. | 260—22 |
| 3,153,087 | 10/1964 | Kramer et al. | 260—327 |
| 3,154,507 | 10/1964 | Kramer et al. | 260—22 |
| 3,180,876 | 4/1965 | Joo | 260—327 |

SAMUEL H. BLECH, *Primary Examiner.*

WILLIAM H. SHORT, *Examiner.*

L. M. MILLER, *Assistant Examiner.*